United States Patent
Edirisooriya et al.

(10) Patent No.: US 7,360,007 B2
(45) Date of Patent: Apr. 15, 2008

(54) SYSTEM INCLUDING A SEGMENTABLE, SHARED BUS

(75) Inventors: Samantha J. Edirisooriya, Tempe, AZ (US); Hang T. Nguyen, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1067 days.

(21) Appl. No.: 10/231,644

(22) Filed: Aug. 30, 2002

(65) Prior Publication Data

US 2004/0042496 A1   Mar. 4, 2004

(51) Int. Cl.
G06F 13/00 (2006.01)
G06F 9/34 (2006.01)
H04L 12/28 (2006.01)
H04L 12/24 (2006.01)
H04J 1/00 (2006.01)
H04J 3/02 (2006.01)

(52) U.S. Cl. ............... 710/307; 710/316; 711/211; 370/400; 370/423; 370/489; 370/541

(58) Field of Classification Search ............ 710/316, 710/307; 370/400, 423, 489, 541; 711/211
See application file for complete search history.

(56) References Cited

U.S. PATENT DOCUMENTS

| | | | |
|---|---|---|---|
| 5,375,097 A * | 12/1994 | Reddy et al. | 365/230.06 |
| 5,847,580 A * | 12/1998 | Bapat et al. | 326/82 |
| 5,909,219 A * | 6/1999 | Dye | 345/582 |
| 5,916,312 A * | 6/1999 | Phung et al. | 710/307 |
| 6,199,129 B1 * | 3/2001 | Maul | 710/301 |
| 6,526,470 B1 * | 2/2003 | Cress et al. | 710/307 |
| 6,662,256 B1 * | 12/2003 | Foo | 710/305 |
| 6,721,840 B1 * | 4/2004 | Allegrucci | 710/306 |
| 6,754,760 B1 * | 6/2004 | Yee et al. | 710/307 |
| 6,880,133 B2 * | 4/2005 | Meyer et al. | 716/1 |
| 6,882,082 B2 * | 4/2005 | Greeff et al. | 310/307 |
| 6,996,650 B2 * | 2/2006 | Calvignac et al. | 710/305 |
| 2004/0114609 A1 * | 6/2004 | Swarbrick et al. | 370/400 |

* cited by examiner

*Primary Examiner*—Mark H. Rinehart
*Assistant Examiner*—Christopher Daley
(74) *Attorney, Agent, or Firm*—Schwegman, Lundberg & Woessner, P.A.

(57) ABSTRACT

A system includes a bus shared by a plurality of devices and a logic circuit adapted to segment the bus into a plurality of portions. In one embodiment of the present invention, the system may include a plurality of devices and a first multiplexer logic circuit adapted to select signals from the plurality of devices. A second multiplexer circuit may receive the selected signals from the first multiplexer circuit and transmit the selected signals to chosen ones of the plurality of devices.

12 Claims, 6 Drawing Sheets

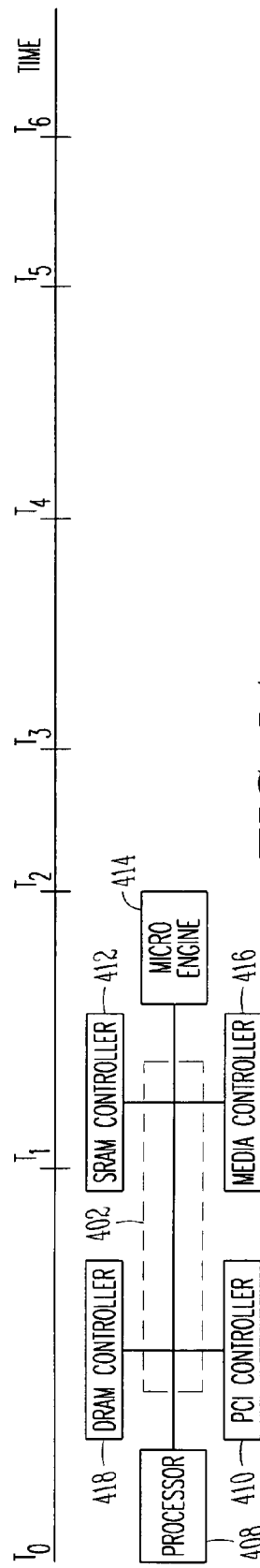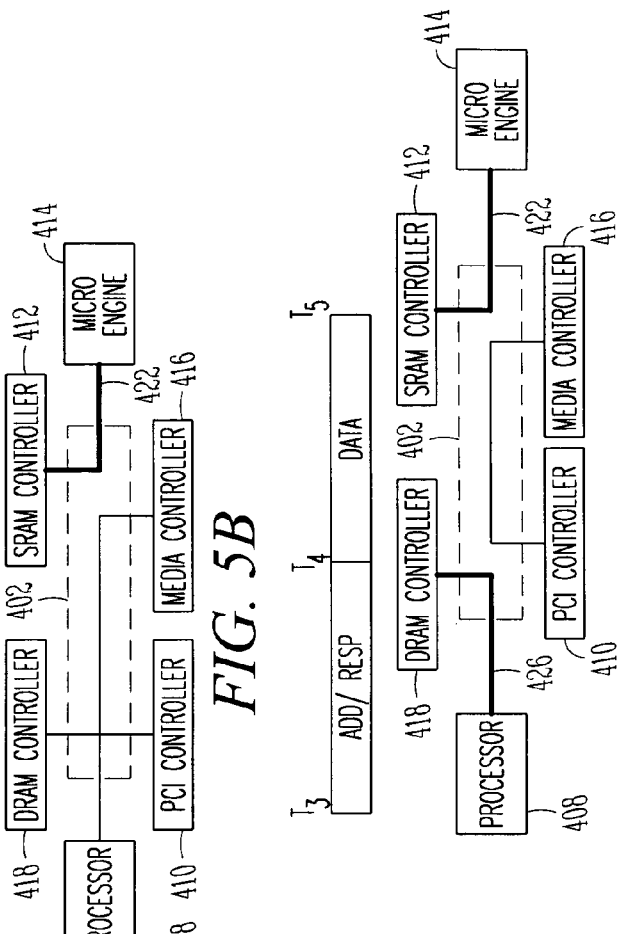

SYSTEM INCLUDING A SEGMENTABLE, SHARED BUS

FIELD OF THE INVENTION

The present invention relates generally to electronic systems, such as computer systems, telecommunication systems and the like, and more particularly to a system including a segmentable, shared bus architecture.

BACKGROUND INFORMATION

Shared buses provide a simple, low-cost means for handling data transfers between various devices or components of an electronic system. Shared buses are used extensively in computer systems and the like. The shared buses may be used to interconnect central processing units (CPUs) to memory systems and to input/output devices. The overall performance of a bus may be determined by the frequency or the speed at which the bus can transmit bits of data, the bandwidth or number of bits the bus can transmit simultaneously and the protocol or set of rules, procedures or conventions relating to formatting and timing of data transmission between two devices of a system. In general, all devices connected to a shared bus rely on the single bus for communicating with each other. The shared bus can establish communications between typically only two devices at any given time. Accordingly, if the shared bus is currently busy transmitting signals between two of the devices, the other devices must wait for their turn to establish communications. This presents latencies in transferring data and slows down the operation of the system. In contrast, there is an increasing demand for faster system operation, higher bandwidths and lower latencies. To meet these demands, more buses can be provided or the bandwidth of the shared bus can be increased by adding more signal lines or conductive traces. Additional lines consume valuable space on printed circuit boards, in the case of an external bus, or silicon area, in the case of on-chip buses. Long sets of parallel lines attached to multiple loads may also present problems, such as impedance mismatches, reflections, crosstalk, noise, nonlinearities, attenuation, distortion, timing problems and the like. Large buses are also inefficient for small data transfers.

BRIEF DESCRIPTION OF THE DRAWINGS

FIGS. 5A-5E illustrate the operation of the segmentable, shared bus in accordance with an embodiment of the present invention.

DESCRIPTION OF THE PREFERRED EMBODIMENTS

The following detailed description of preferred embodiments refers to the accompanying drawings which illustrate specific embodiments of the invention. Other embodiments having different structures and operations do not depart from the scope of the present invention.

Figure 1:
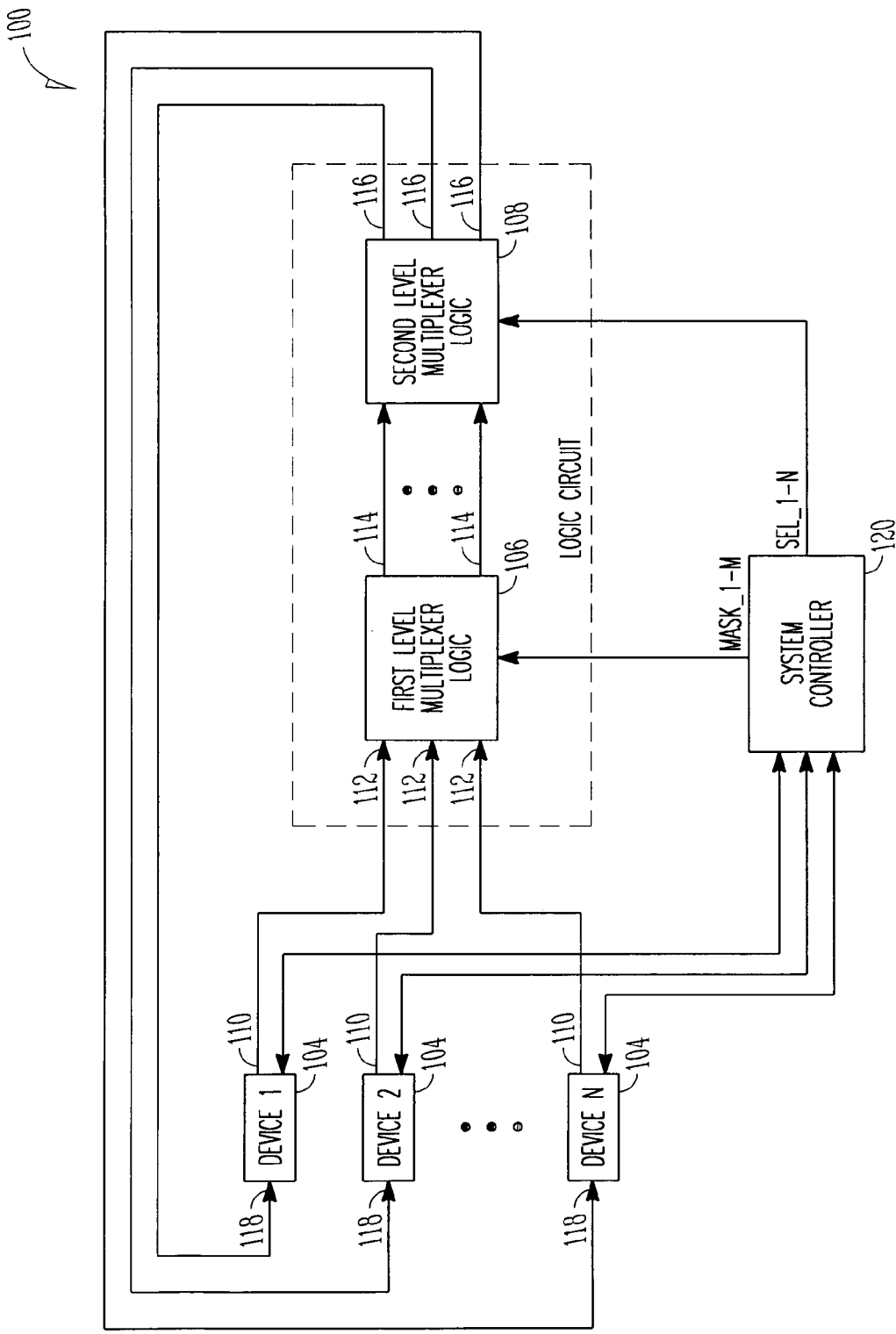
FIG. 1 is a block diagram of a system including a segmentable, shared bus in accordance with an embodiment of the present invention.

FIG. 1 is a block diagram of a system 100 including a segmentable, shared bus 102 in accordance with an embodiment of the present invention. The system 100 includes a plurality of devices 104 that may be coupled to the segmentable, shared bus 102. The bus 102 includes a logic circuit 105 adapted to segment the bus 102 into a plurality of portions or segments (not shown in FIG. 1). The logic circuit 105 may be a multiplexer logic circuit including a first level multiplexer logic circuit 106 and a second level multiplexer logic circuit 108. The outputs 110 of each of the plurality of devices 104 may be connected to inputs 112 of the first level multiplexer circuit 106. The outputs 114 of the first level multiplexer circuit 106 are connected to the second level multiplexer circuit 108 and the outputs 116 of the second level multiplexer circuit 108 may be connected to inputs 118 of the plurality of devices 104.

The system 100 further includes a system controller 120. The system controller 120 may be coupled to the devices 104 and to the first and second multiplexer circuits 106 and 108 to control operation of the circuits 106 and 108. The first and second level multiplexer logic circuits 106 and 108 segment or isolate at least one portion of the bus 102 that interconnects two or more of the devices 104 in response to control signals (MASK_1-M[N:1] and SEL_1-N[S:1]) from the system controller 120.

Figure 2:
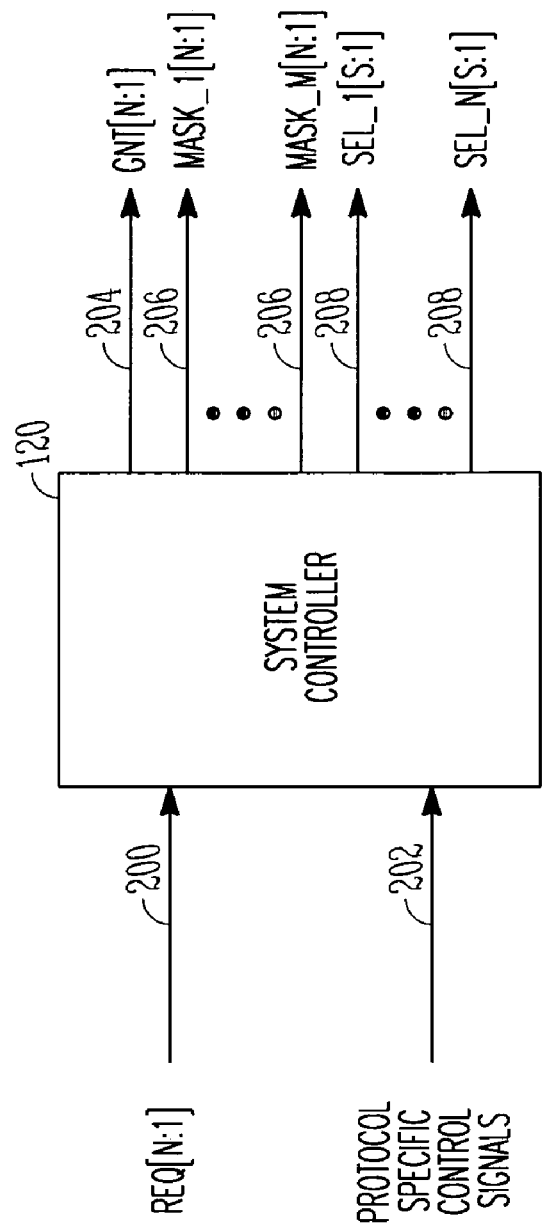
FIG. 2 is a block diagram of a system controller and the input and output signals of the controller in accordance with an embodiment of the present invention.

FIG. 2 is a block diagram of the system controller 120 and examples of the possible input and output signals of the controller 120. The controller 120 may receive a request signal (REQ[N:1]) 200 from one of the devices 104 to transmit data or signals to at least one other of the devices 104. The controller 120 may also receive protocol specific control signals 202 from one of the devices 104 that may be a processor or memory device, or the controller 120 may receive protocol signals 202 from an external source, such as a CPU or other device in a larger system (not shown in the drawings) of which the system 100 (FIG. 1) may be a subsystem. The controller 120 may transmit a grant signal (GNT[N:1]) 204 to the requesting device 104 depending upon the protocol and any current transactions between the devices 104. The controller 120 may also transmit MASK_1-M[N:1] control signals 206 to the first level multiplexer circuit 106 and SEL_1-N[S:1] control signals 208 to the second level multiplexer circuit 108 to segment the bus 102 and selectively couple the requesting device 104 to the other device 104 or devices 104 with which the requesting device 104 desires to communicate. The controller 120 may not segment the bus 102 to isolate the devices 104 conducting a transaction under all circumstances. Depending upon predetermined parameters, such as the nature of the transaction, the expected duration of the transaction, the priority of the transaction, other transactions currently being conducted and how the bus is currently segmented, the controller 120 may leave the bus 102 intact during the transaction between the devices 104. For example, the controller 120 may not segment the bus 102 if the transaction is short or the transaction between the devices 104 can wait until the bus 102 is idle.

Figure 3:
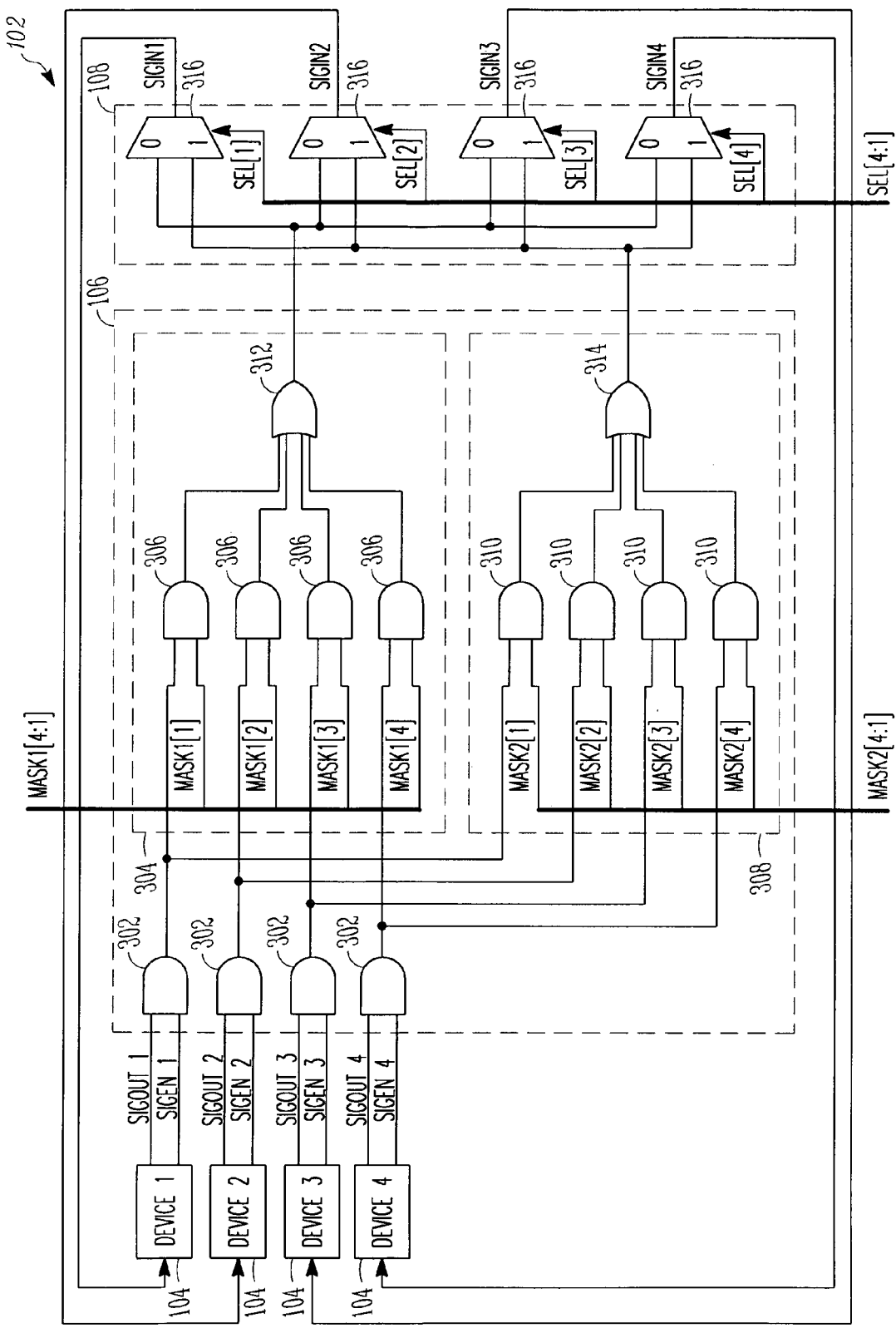
FIG. 3 is a logic diagram of an example of a segmentable, shared bus in accordance with an embodiment of the present invention.

FIG. 3 is a logic diagram of an example of the segmentable, shared bus 102 in accordance with an embodiment of the present invention. Only four devices 104 (DEVICES 1-4) are shown in FIG. 3 for simplicity in illustrating the bus 102; although, the system 100 may include any number of devices 104 interconnected by the shared bus 102. The first level multiplexer circuit 106 may include a group of input AND gates 302. Each of the input AND gates 302 may be respectively connect to an associated one of the devices 104 to receive an output signal (SIGOUT 1-4) and an enable signal (SIGEN 1-4) from the associated device 104. The first level multiplexer circuit 106 also includes a first set 304 of AND gates 306 and a second set 308 of AND gates 310. An output of each of the input AND gates 302 may be respectively connected to one input of an associated one of the AND gates 306 and 310 in each set 304 and 308 of AND gates. Another input of each AND gate 306 may be connected to the system controller 120 to receive a respective control signal MASK_1[4:1] and another input of each AND gate 310 may be connected to the system controller 120 to receive a respective control signal MASK_2[4:1]. The quantity of AND gates 306 and 310 in each set 304 and 308 may correspond to the quantity of devices 104 in the system 100 and the number of sets 304 and 308 of AND gates may be predetermined to correspond to the number of possible concurrent interconnects or transactions between different ones of the plurality of devices 104. Accordingly, if there are more devices 104, then additional sets of AND gates and additional AND gates in each set may be provided if the capacity for additional concurrent transactions between the devices 104 is desired. The input AND gates 302 define a logic switch or filter to only couple to the gates 306 and 310 the output signals SIGOUT 1-4 of those devices 104 that also transmit an enable signal SIGEN 1-4 at the same time.

An output of each AND gate 306 of the first AND gate set 304 may be connected to a corresponding OR gate 312 and an output of each AND gate 310 of the second AND gate set 308 may be connected to another corresponding OR gate 314. An output of each OR gate 312 and 314 may be connected to the second level multiplexer circuit 108. The second level multiplexer circuit 108 includes a chosen number of multiplexers 316 to select between each of the predetermined number of sets 304 and 308 of AND gates 306 and 310. Each OR gate 312 and 314 maybe coupled to a respective input of each of the multiplexers 316. The output of the OR gate 312 may be connected to the 0 input of each multiplexer 316 and the output of the OR gate 314 may be connected to the 1 input of each multiplexer 316. An output of each multiplexer 316 is coupled to an input of an associated one of the plurality of devices 104. The chosen number of multiplexers 316 may correspond to the number of devices 104. Each multiplexer 316 may be connected to the system controller 120 to receive a control signal SEL [4:1] to select between the OR gates 312 and 314 or AND gate sets 304 and 308 and to effectively couple the outputs of selected devices 104 to the inputs of the selected devices 104 to transmit input signals SIGIN 1-4 when present to the respective devices 104.

In operation, initially, the four SEL [4:1] control signals may be set to 0000, respectively, the MASK_1[4:1] control signals may be set to 1111, respectively, and the MASK_2 [4:1] control signals may be set to 0000. In this configuration, the bus 102 is intact and not segmented and a signal SIGOUT 1-4 from any of the devices 104 (DEVICE 1-4) accompanied with an enable signal, SIGEN 1-4, will be coupled through the first set 304 of AND gates 306, the OR gate 312 and the 0 inputs of each multiplexer 316 to a corresponding input of each of the devices 104 (DEVICE 1-4). As an example, assume DEVICE 1 is driving a signal SIGOUT 1 and SIGEN 1 is set to 1. The controller 120 determines from an address/response signaling phase that DEVICE 1 will communicate with DEVICE 4 during the transaction. The controller 120 segments the bus 102 to isolate or decouple the interconnection between DEVICE 1 and DEVICE 4 by setting the four SEL [4:1] control signals to 0110, the four MASK_1[4:1] control signals to 1001 and the four MASK_2[4:1] control signals to 0000. DEVICE 1 and DEVICE 4 are then interconnected through the first AND gate set 304 and the multiplexers 316 connected respectively to DEVICE 1 and DEVICE 4. Next assume that simultaneously with the transaction between DEVICE 1 and DEVICE 4, DEVICE 2 establishes a transaction with DEVICE 3. To establish the interconnection, the controller 120 sets the four SEL [4:1] control signals to 0110, the four MASK_1[4:1] control signals remain the same and the four MASK_2[4:1] control signals are set to 0110. Accordingly, DEVICE 2 and DEVICE 3 are interconnected through the second AND gate set 308 and the multiplexers 316 connected respectively to DEVICE 2 and DEVICE 3. Effectively, DEVICE 2 and DEVICE 3 are decoupled from DEVICE 1 and DEVICE 4 so that concurrent transactions can occur between the interconnected DEVICES 1-4 without interfering with each other. Similarly, the bus 102 may be segmented to isolate a connection between three of the devices 104. For example, DEVICE 1, DEVICE 2 and DEVICE 4 may be interconnected and decoupled from DEVICE 3 through the first AND gate set 304 by setting the MASK_1[4:1] control signals to 1011, the MASK_2[4:1] control signals to 0000 and the SEL [4:1] control signals to 0010 or 0000. The MASK_1 and MASK_2 signals could be interchanged to interconnect the DEVICES 1, 2 and 4 through the second AND gate set 308.

Figure 4:
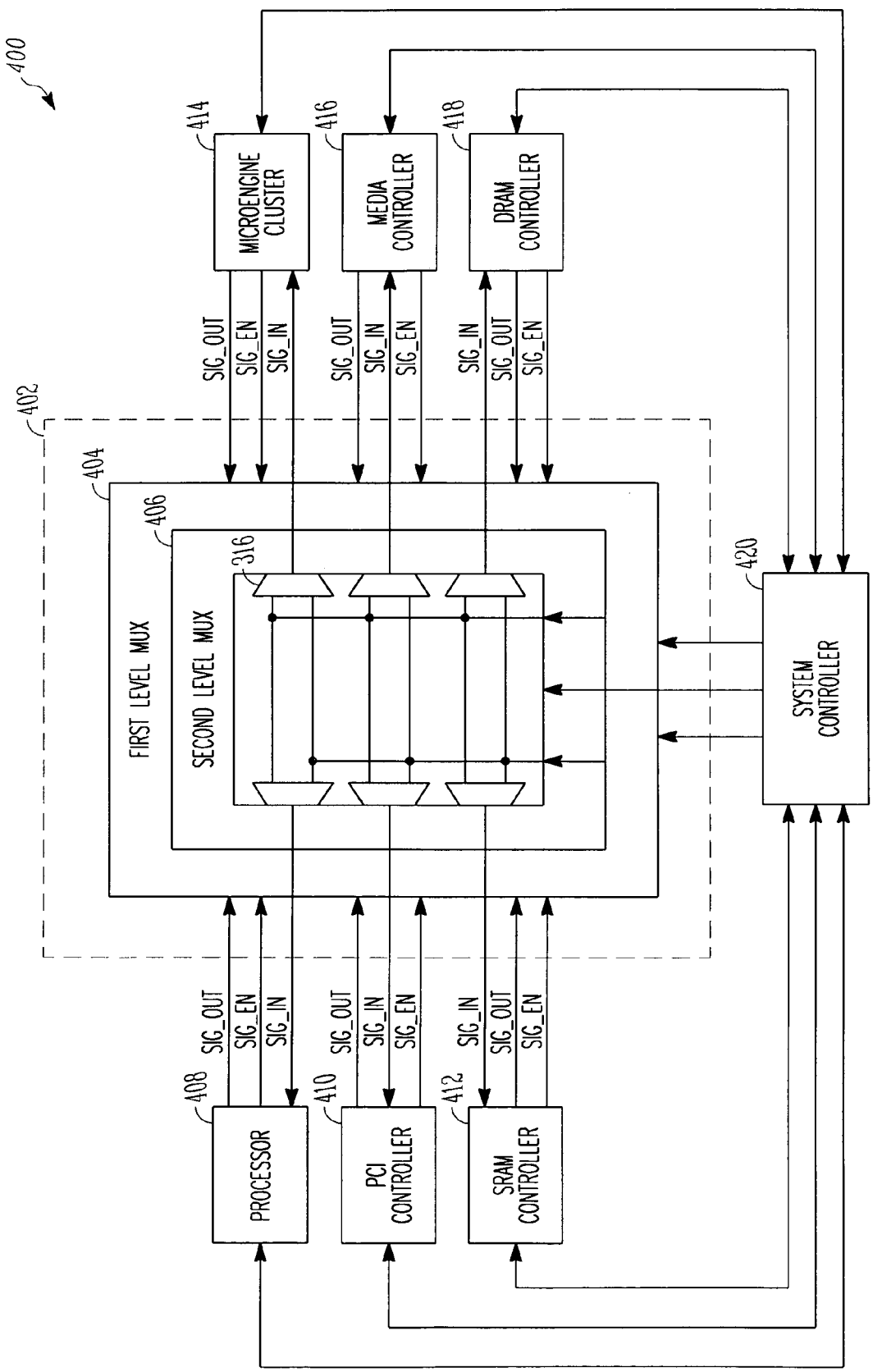
FIG. 4 is a block diagram of an electronic system including a segmentable, shared bus in accordance with an embodiment of the present invention.

FIG. 4 is a block diagram of an electronic system 400 including a segementable, shared bus 402 in accordance with an embodiment of the present invention. The segmentable, shared bus 402 includes a first level multiplexer 404 and a second level multiplexer 406 coupled to the first level multiplexer 404. A plurality of device 408-418 each have outputs coupled to the first level multiplexer 404 and an input coupled to the second level multiplexer 406. In the example of FIG. 4, the devices 408-418 may include a processor 408, a peripheral component interface (PCI) controller 410, a static random access memory (SRAM) controller 412, a micro engine cluster 414, a media controller 416 and a dynamic random access memory (DRAM) controller 418. A system controller 420 may be coupled to the devices 408-418 and to the first and second level multiplexers 404 and 406. The multiplexers 404 and 406 may have a structure similar to multiplexer circuits 106 and 108 of FIG. 3.

Figure 5D:
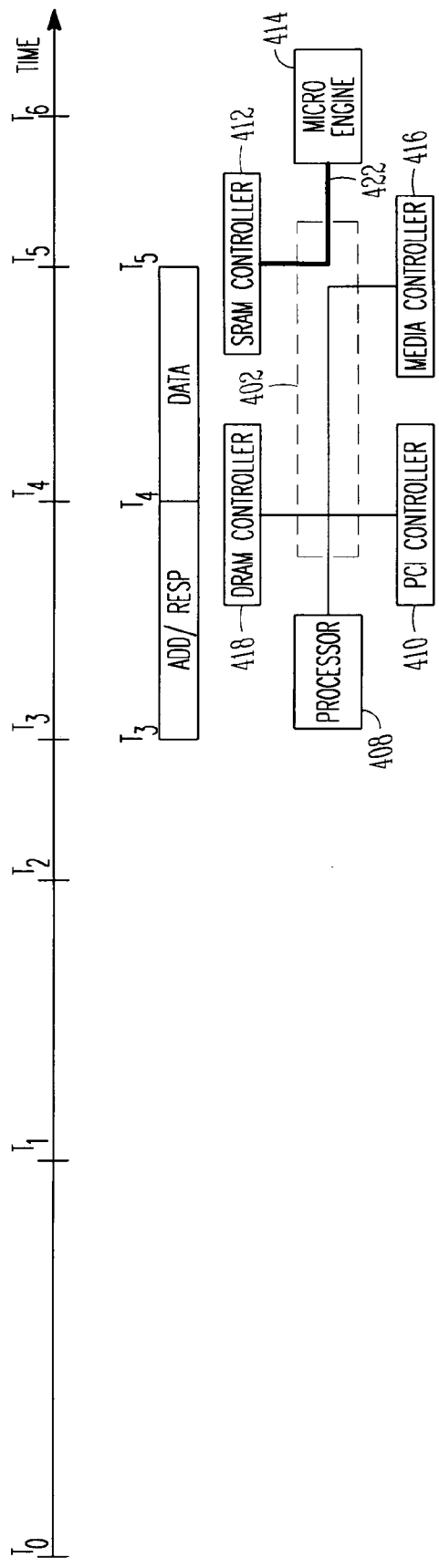

An example of the operation of the segmentable, shared bus 402 is described with reference to FIGS. 5A-5E. Initially at time To the bus 402 interconnects all of the devices 408-418 as shown in FIG. 5A. In FIG. 5B, at time $T_1$ a request signal or an address signal may be sent by the micro engine cluster 414 on the bus 402 to start a transaction. In this example, the nature of the transaction requires communication with the SRAM controller 412 and the SRAM controller 412 sends a response signal on the bus 402. The system controller 420 monitors the traffic on the bus 402 and applies a predetermined protocol to determine whether the bus 402 should be segmented for the particular transaction between the micro engine cluster 414 and the SRAM controller 412. As previously discussed with respect to FIG. 1, the system controller 420 may not segment the bus 402 to isolate or decouple selected ones of the devices 408-418 conducting a transaction together under some circumstances, depending upon the protocol and the nature of the transaction. For example, depending upon the expected duration of the transaction, the priority of the transaction, other transactions currently being conducted and how the bus is currently segmented, the system controller 420 may leave the bus 402 intact. If the protocol calls for the bus 402 to be segmented, the system controller 420 sends control signals to the first and second level multiplexer circuits 404 and 406 (FIG. 4) to segment a portion 422 of the bus 402 interconnecting the SRAM controller 412 and the micro engine cluster 414 as shown in FIG. 5B. The portion 422 forms a mutually exclusive interconnection between the SRAM controller 412 and the micro engine cluster 414 to avoid interference from the other devices 408-418 connected to the bus 402. Accordingly, after an address/response signaling phase between times $T_1$ and $T_2$, the bus 402 is segmented to transmit data between the SRAM controller 412 and the micro engine cluster 414. A remaining portion 424 of the bus 402 may remain intact for transactions between the remaining devices 408, 410, 416 and 418.

In FIG. 5C, at time $T_3$, the processor 408 sends an address or request signal to start a transaction and the DRAM controller 418 sends a response signal. Again, the system controller 420 monitors the traffic on the bus 402 and determines if the bus 402 should be segmented based on the nature of the transaction between the processor 408 and the DRAM controller 418 and the predetermined protocol. Assuming the protocol requires that the bus 402 be segmented, the system controller 420 sends the appropriate signals to the first and second level multiplexer circuits 404 and 406 to segment another portion 426 of the bus 402 to isolate or decouple the connection between the processor 408 and the DRAM controller 418 from the remainder of the bus 402 during their transaction. Accordingly, the bus 402 may be segmented into portions 422 and 426 for concurrent transactions between the micro engine cluster 414 and the SRAM controller 412 and between the processor 408 and the DRAM controller 418. Similarly, a third transaction may be conducted between the PCI controller 410 and the media controller 416. Accordingly, the first and second level multiplexers 404 and 406 are adapted to segment the bus 402 into a plurality of bus portions, such as portions 422, 426 and any remaining bus portions. Each of the plurality of bus portions 422 and 426 form a mutually exclusive interconnect for concurrent transmission of signals between the selected devices 408-418 interconnected by each of the bus portions 422 and 426 and any remaining bus portions or segments.

Figure 5E:
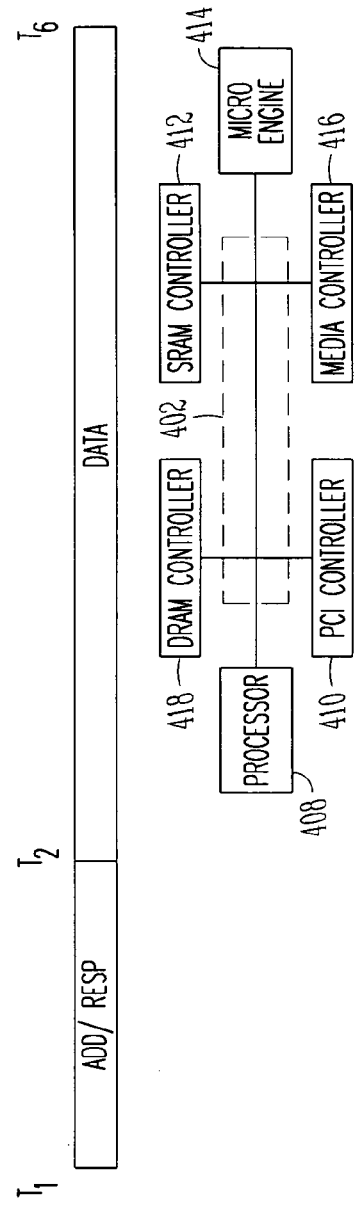

In FIG. 5D, at time $T_5$, the transaction between the processor 408 and the DRAM controller 418 is completed and the portion or segment 426 is restored to the bus 402. In FIG. 5E, at time $T_6$, the transaction between the micro engine cluster 414 and the SRAM controller 412 is completed and the portion or segment 422 is also restored to the bus 402 such that all of the devices 408-418 are again interconnected by the bus 402.

Although specific embodiments have been illustrated and described herein, those of ordinary skill in the art appreciate that any arrangement which is calculated to achieve the same purpose may be substituted for the specific embodiments shown. This application is intended to cover any adaptations or variations of the present invention. Therefore, this invention is limited only by the claims and the equivalents thereof.

What is claimed is:

1. A system, comprising:
a plurality of devices;
a first multiplexer logic circuit adapted to select signals from the plurality of devices; and
a second multiplexer logic circuit to receive the selected signals from the first multiplexer circuit and to transmit the selected signals to chosen ones of the plurality of devices; and
wherein:
the first multiplexer logic circuit includes a plurality of pairs of gates, each gate having a plurality of inputs, each pair of gates having an input coupled to receive signals from a respective one of a plurality of devices, each device being coupled to send signals to a respective pair of the gates;
the second multiplexer logic circuit is coupled to the first multiplexer logic circuit, the second multiplexer circuit including a plurality of multiplexers coupled to receive signals from the gates in the first multiplexer circuit, second multiplexer logic circuit including a multiplexer for each pair of gates in the first multiplexer logic circuit, each multiplexer having an output coupled to one of the devices to couple signals to one of the devices; and
a control circuit is coupled to the first multiplexer logic circuit and to the second multiplexer logic circuit to generate control signals to enable selected ones of the gates of the first multiplexer logic circuit to couple signals to the second multiplexer logic circuit and to cause the second multiplexer logic circuit to select signals from the first multiplexer logic circuit to be coupled to selected ones of the devices.

2. The system of claim 1, further comprising a controller, wherein the first multiplexer logic circuit selects the signals from the plurality of devices in response to control signals from the controller and the second multiplexer logic circuit couples the selected signals to the chosen ones of the plurality of devices in response to other control signals from the controller.

3. The system of claim 1, wherein the first multiplexer circuit comprises a predetermined number of sets of gates corresponding to a number of possible concurrent interconnects between different ones of the plurality of devices.

4. The system of claim 1, wherein the second multiplexer circuit comprises a predetermined number of multiplexers corresponding to the number of the plurality of devices.

5. The system of claim 1, wherein:
each of the pairs of gates is a pair of AND gates, each AND gate having a first input coupled to receive signals from a respective one of a plurality of devices and a second input coupled to receive a control signal from the control circuit;
each of the pair of AND gates includes a first AND gate in a first group and a second AND gate in a second group;
the first multiplexer circuit includes a first OR gate and a second OR gate, each OR gate having an input for each of the devices, the inputs of the first OR gate being coupled to outputs of the AND gates in the first group and the inputs of the second OR gate being coupled to outputs of the AND gates in the second group; and
each of the multiplexers includes a first input coupled to an output of the first OR gate and a second input coupled to an output of the second OR gate, each of the multiplexers having a control input coupled to receive a control signal from the control circuit to enable the multiplexers to couple selected signals from the OR gates to respective ones of the devices, each multiplexer having an output coupled to one of the devices.

6. A method, comprising:

initiating at least one transaction between at least two devices of a plurality of devices interconnected by a shared bus;

determining if the at least one transaction between the at least two devices requires segmentation of the shared bus; and segmenting the shared bus into at least two portions to isolate the at least two devices in response to a nature of the at least one transaction including:

coupling signals from each of a plurality of devices to respective pairs of gates in a first multiplexer logic circuit, each gate having a plurality of inputs, each pair of gates having an input coupled to receive signals from a respective one of the devices;

controlling the pairs of gates in the first multiplexer logic circuit to couple selected signals to inputs of multiplexers in a second multiplexer logic circuit; and controlling the multiplexers in the second multiplexer logic circuit to couple signals to respective ones of the devices.

7. The method of claim 6, further comprising segmenting the shared bus into other portions in response to other transactions between other devices of the plurality of devices requiring segmentation of the shared bus.

8. The method of claim 6, further comprising segmenting the shared bus into multiple portions to support multiple different transactions between selected devices of the plurality of devices concurrently.

9. The method of claim 8, wherein segmenting the shared bus into multiple portions comprises interconnecting the selected devices of each different transaction by at least one logic circuit.

10. The method of claim 6, wherein initiating the at least one transaction comprises:

transmitting at least one signal on the shared bus from at least one device of the plurality of devices; and transmitting at least one response from at least one other device of the plurality of devices on the shared bus.

11. The method of claim 6, wherein determining if the at least one transaction requires segmentation of the shared bus comprises applying a protocol.

12. The method of claim 6, wherein:

coupling signals from each of a plurality of devices includes, for each device, coupling signals from the device to a first input of a first AND gate in a first group and a first input of a second AND gate in a second group;

controlling the pairs of gates includes:

coupling respective control signals from a control circuit to a second input of each of the AND gates to enable selected ones of the AND gates to couple signals from the devices to outputs of the selected AND gates;

coupling signals from outputs of the AND gates in the first group to respective inputs of a first OR gate; and coupling signals from outputs of the AND gates in the second group to respective inputs of a second OR gate; and controlling the multiplexers in the second multiplexer logic circuit includes:

receiving signals from an output of the first OR gate in a first input of each multiplexer;

receiving signals from an output of the second OR gate in a second input of each multiplexer; and controlling the multiplexers in the second multiplexer logic circuit with control signals from the control circuit to couple signals to respective ones of the devices, each multiplexer having an output coupled to an input of one of the devices.

* * * * *